United States Patent Office 3,036,888
Patented May 29, 1962

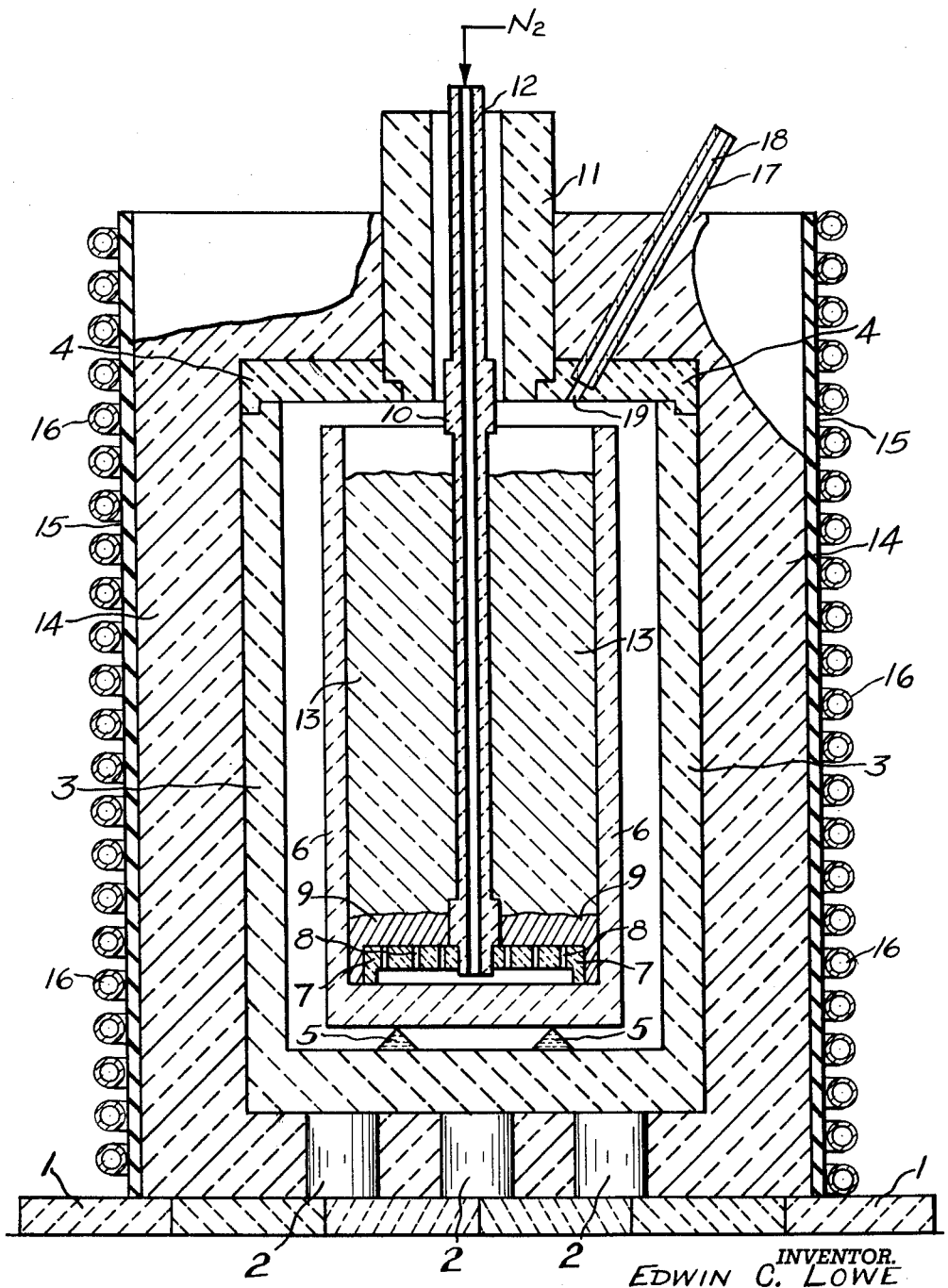

3,036,888
PROCESS FOR PRODUCING TITANIUM NITRIDE
Edwin C. Lowe, Chippawa, Ontario, Canada, assignor to Norton Company, Worcester, Mass., a corporation of Massachusetts
Filed Dec. 29, 1959, Ser. No. 862,554
5 Claims. (Cl. 23—191)

The invention relates to the production of nitrides and provides a process for producing titanium nitride of a kind that will hereinafter be described.

One object of the invention is to provide a cheap process for making titanium nitride on a commercial scale. Another object of the invention is to produce titanium nitride with a minor proportion of titanium carbide and of titanium monoxide. Another object is to provide a process in which the results can be readily duplicated.

Another object of the invention is to produce a material useful for igniters for rectifiers as taught in my late colleague Guy H. Fetterley's Patent #2,439,290. Another object is to produce a refractory conductor of positive temperature coefficient of resistance, useful for the manufacture of heater rods for electric resistance furnaces and which is resistant to oxidation. Another object of the invention is to produce a product by an inexpensive process which has many potential uses not yet well developed because there has not been any inexpensive titanium nitride on the market before my invention.

Other objects will be in part obvious or in part pointed out herein.

The accompanying drawing is a vertical axial sectional view of an electric furnace which has been used to carry out my process.

For a quick understanding of the nature of the present invention, the reaction of my invention is in outline shown by the following equation:

(1)     $2TiO_2 + 4TiC + 3N_2 = 6TiN + 4CO$ $TiO_2$ is titanium dioxide, usually called titania. It is the principal constituent of the mineral rutile. Other sources of titania include slag from ores of iron and titanium after the iron has been removed.

Titanium carbide is an electric furnace product and it is extracted from rutile or the slag mentioned and coke in an electric arc furnace, producing ingots of many hundred pounds of each run of the furnace. This material is sold on the open market.

A suitable furnace to use in the process of this invention is shown in the drawing. A brick base 1 supports refractory posts 2 which support a cylindrical furnace container 3 made of graphite having a graphite cover 4. Supported on a pair of graphite knife edges 5 is a crucible 6 also made of graphite. On the bottom of the crucible 6 rests a graphite diffuser plate 7 having many holes 8 therethrough. The crucible 6 is a furnace chamber and graphite is one form of carbon. Ungraphitized carbon could be used for the furnace chamber 6.

A coke bed 9 is laid upon diffuser plate 7 as shown. A graphite tube 10 extends through the diffuser plate 7 and through the crucible 6 being conveniently located axially therein, and through a surrounding graphite vent tube 11 to the top thereof. Nitrogen is pumped through the bore 12 of the tube 10, passes upwards through the holes 8 and through the coke bed 9 in the mix 13 where it reacts with the $TiO_2$ and TiC and the remainder emerges into the space between the container 3 and the crucible 6 and goes out of the vent tube 11.

Surrounding the container 3 as thermal insulation for the furnace is comminuted zirconia or carbon black 14, the former being generally preferred but any other suitable insulation can be used. This is held in place by a cylindrical shell 15, which can be made of asbestos and which rests upon the brick base 1. Surrounding the cylindrical shell 15 is a water cooled high frequency energized induction coil 16 which constitutes the primary for electrical heating of the furnace, the secondary being chiefly the cylindrical furnace container 3 which is therefore the "susceptor." A graphite pyrometer tube 17 having a bore 18 extends through some of the insulation 14 and into the cover 4, the bore 18 being in line with a countersunk bore 19 in the cover 4 to read the temperature of the mix 13 from time to time.

This completes the description of the apparatus which is detailed to give the best mode of the invention, but the process of the invention is in no way limited to any particular apparatus. High frequency induction apparatus is now well known and need not be further explained. The furnace described, however, is standard equipment in electro-chemical plants and the fact that standard equipment can be used is one of the advantages of the process of my invention. As a further definition of the best mode for carrying out the invention, I recommend a furnace container 3 with cover 4 of an overall height of three feet, the rest of the apparatus in proportion as shown.

The raw materials for the mix 13 should be finely divided. Crude titanium carbide, made in the arc furnace as stated, and crushed to pass a screen having an average opening 0.010" on a side is suitable. The titanium dioxide should be at least as fine, and a commercial pigment grade averaging one micron in particle diameter and over 99% purity is preferred.

The raw materials are provided in the stoichiometric proportions of one mol of $TiO_2$ to two mols of TiC to match the foregoing equation or with more or less of one to the other as hereinafter stated. They are thoroughly mixed and then packed in the crucible 6 as shown. Then the furnace is heated to about 1800° C.–1950° C. for about five hours while a slow stream of nitrogen is passed through the charge which is the mix 13, entering through the bore 12 and emerging through the vent 11. After that the circuit to the induction coil 16 is opened and the furnace is allowed to cool. When it has cooled, the product, mostly titanium nitride TiN, is found to be reddish brown and friable having a dark colored skin on the bottom and on the cylindrical outside next to the inside wall of the crucible 6. This is high carbon material due to the carbon of the coke and of the graphite. This high carbon material is a by-product and can be used as part of the raw material for a subsequent run after analysis. It is separated from the valuable product of the process, mostly TiN, by sorting after the contents of the crucible 6 has been removed by digging it out which of course breaks it up. In accordance with the equations given, carbon monoxide is also formed and this escapes with the surplus nitrogen.

EXAMPLE I

A batch for the charge or mix 13 was made up according to the following table:

*Table I*

| Batch Component | Weight in Lbs. | Percentage in Batch | Description of Material |
|---|---|---|---|
| TiC | 90.5 | 47.6 | Crude TiC crushed to pass a screen having openings 0.009 inch on a side. |
| $TiO_2$ | 99.5 | 52.4 | "Titanox" pigment grade $TiO_2$, about one micron particle size, over 99% $TiO_2$. |
| Total | 190.0 | 100.0 | |

The overall batch had a composition, calculated from the analysis of the batch components, as follows:

Table II

| Material: | Percentage by weight |
|---|---|
| Titanium dioxide, $TiO_2$ | 52.4 |
| Titanium Carbide, TiC | 41.0 |
| Free carbon | 5.1 |
| Unidentified | 1.5 |
| | 100.0 |

This batch was thoroughly mixed and then shovelled into the crucible 6 to form the mix 13 and then the furnace assembly was completed as shown and described. The electric current was then turned on to energize the coil 16 and nitrogen was flowed through the furnace as described at the rate of nine pounds per hour (this furnace had a container 3 and cover 4 three feet high, the rest of the dimensions in proportion as shown) while the charge was heated according to the following schedule:

Table III

| Temperature, °C.: | Time in hours |
|---|---|
| 1800–1950 | 1 |
| 1950 | 12.5 |
| 1950–1800 | .5 |
| | 14.0 |

When the furnace had cooled, the crucible 6 was found to be filled with a reddish brown material (No. 1 product) covered with a crust of dark gray skin of the high carbon material (No. 2 product) as above explained. These materials were removed from the crucible 6, separated by sorting, weighed and analyzed. The analysis is indicated in the following table:

Table IV

| No. 1 product (131.5 lbs.): | Percent |
|---|---|
| Ti | 75.34 |
| N | 19.61 |
| C | 1.16 |
| Fe | 0.04 |
| Unidentified | 3.85 |
| No. 2 product (16.5 lbs): | |
| Ti | 75.76 |
| N | 15.83 |
| C | 4.89 |
| Fe | 0.10 |
| Unidentified | 3.42 |

The No. 1 product contained an estimated 86.7% of TiN, 5.8% TiC and the remainder probably TiO. Since TiN, TiC and TiO have rather similar properties and form a continuous series of solid solutions, this product is homogeneous and constitutes a thoroughly satisfactory commercial grade of TiN for most purposes.

For my process producer gas (essentially $N_2$ and CO) would be the cheapest source of nitrogen for large scale production. Rutile can be used as the source of titania if it is ground until the largest particles are not more than 0.010 inch in diameter.

This process is much cheaper than the well known method of reacting titanium tetrachloride, $TiCl_4$, with ammonia, $NH_3$, and calcining the resulting reaction product. I have tried another process, whether new with me or not I do not know, in which $TiO_2$ is heated with carbon in the presence of nitrogen according to the following equation:

(2) $\quad 2TiO_2 + 4C + N_2 = 2TiN + 4CO$

However, the above reaction permits only about two-thirds as much TiN to be made per run in a furnace of given size as does the process of the present invention. Processes that operate at temperatures near 2000° C. are inherently costly, and the increase in output given by the present process is quite attractive for that reason.

The present process has the advantage over many others that the product is friable and easily crushed to a fine powder for further processing. This is a considerable advantage for a material as hard and metallic as TiN. It is also free of oxides and other materials that would have to be leached out. On investigation it was also found that the reaction of the present invention proceeds much faster than that of $TiO_2$ with carbon and nitrogen but without TiC in the raw material, providing a further reduction in cost.

EXAMPLE II

The raw material batch had the following composition:

Table V

| Batch Component | Weight in Lbs. | Percentage in Batch | Description of Material |
|---|---|---|---|
| TiC | 9 | 60 | Crude TiC crushed to pass a screen having openings 0.005 inch on a side. |
| $TiO_2$ | 6 | 40 | "Titanox" pigment grade $TiO_2$, about 1 micron particle size, over 99% $TiO_2$. |
| Total | 15 | 100 | |

The overall mixture had a composition, calculated from the analyses of the constituents, as follows:

Table VI

| Material | Percent | Percentage by Weight |
|---|---|---|
| $TiO_2$ | 40.0 | 44.1. |
| TiC | 49.0 | 54.1. |
| TiN in TiC | 9.1 | Assumed zero. |
| Free C | 1.6 | 1.8. |
| Unidentified | 0.3 | Assumed zero. |

The raw materials were mixed and packed in a furnace similar to the furnace shown in the drawing. Nitrogen was passed through the inlet tube at a rate of one pound per hour while the charge was heated according to the following schedule:

Table VII

| Temperature in ° C.: | Time in hours |
|---|---|
| 1800 | 6 |

When the furnace had cooled it was filled with a purple-red and reddish-brown material (No. 1 product) while a crust of dark gray material had formed next to the graphite. The two products were separated by sorting but only the No. 1 product was weighed and analyzed:

Table VIII

| No. 1 product (13.0 lbs.): | Percent |
|---|---|
| Ti | 77.26 |
| N | 18.29 |
| C | 0.91 |
| Fe | 0.01 |
| Unidentified | 3.53 |

The No. 1 product contained an estimated 80.8% TiN, 4.5% TiC, and the remainder probably TiO. I believe that the unidentified in the charge is mostly $Fe_2O_3$ and $ZrO_2$, and that the unidentified in the product is mostly oxygen, probably mostly in the form of TiO which doesn't have to be leached out as it forms a solid solution with TiN.

The mixes of the examples were not in exact stoichiometric proportions as is easily determined. Taking atomic weights in round numbers, and they are pretty close to that, Ti=48, O=16, C=12. The molecular weights are $TiO_2$=80, TiC=60 and 2TiC=120. Conveniently $TiO_2$+2TiC=200 from which it is seen that the stoichiometric mix is 40% $TiO_2$ and 60% TiC. Even an allowance for free carbon will not balance the equations in the examples. Within the scope of my invention in Equation 1 the range is from 25% excess $TiO_2$ to 25% excess TiC over stoichiometric proportions, which is 45.5% $TiO_2$/54.5% TiC to 34.8% $TiO_2$/65.2% TiC.

Titanium nitride produced by my process and, so far as I know, by the process using $TiCl_4$ and $NH_3$ has a positive temperature coefficient of electrical resistance. It is therefore useful as stated in the objects for the manufacture of heater rods for electric furnaces as it is also resistant to oxidation. Heretofore it has not been used for this purpose so far as I know which is probably due to the high cost of the compound made by the $TiCl_4$—$NH_3$ process.

The temperature of reaction can be as low as 1500° C. in my process but I recommend at least 1800° C. While there is no reason that I know of to raise the temperature of reaction above 1950° C. and above that temperature the process is more costly, yet the temperature of reaction can be raised all the way to the melting point of titanium nitride which is given in the 34th edition of the Handbook of Chemistry and Physics as 2950° C., but later work may give a somewhat different determination so I shall claim as the upper limit the melting point of titanium nitride. For the best economics and practical results the furnace chamber should be made of carbon.

It will thus be seen that there has been provided by this invention a process for producing titanium nitride in which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. Process for the synthesis of titanium nitride consisting in reacting a mixture of titania and titanium carbide with nitrogen in a furnace chamber according to the equation $$2TiO_2 + 4TiC + 3N_2 = 6TiN + 4CO$$

within from 25% excess $TiO_2$ to 25% excess TiC over stoichiometric proportions, the temperature of reaction being between 1500° C. and the melting point of titanium nitride.

2. Process according to claim 1 in which the temperature of reaction is between 1800° C. and 1950° C.

3. Process according to claim 2 in which the furnace chamber is made of carbon.

4. Process according to claim 1 in which the furnace chamber is made of carbon.

5. Process for the synthesis of titanium nitride consisting in reacting a mixture of rutile and titanium carbide with nitrogen in a furnace chamber according to the equation $$2TiO_2 + 4TiC + 3N_2 = 6TiN + 4CO$$

within from 25% excess $TiO_2$ to 25% excess TiC over stoichiometric proportions, the temperature of reaction being between 1500° C. and the melting point of titanium nitride.

References Cited in the file of this patent

UNITED STATES PATENTS

| 976,337 | Becket | Nov. 22, 1910 |
| 1,803,276 | Walter | Apr. 28, 1931 |
| 2,898,193 | Espenschied | Aug. 4, 1959 |

FOREIGN PATENTS

| 23,840 | Great Britain | 1901 |

OTHER REFERENCES

Mellor: "A Comprehensive Treatise on Inorganic and Theoretical Chemistry," vol. VIII, pages 117–119, Longmans, Green and Co., N.Y., 1928.